United States Patent [19]
Stewart

[11] Patent Number: 6,041,652
[45] Date of Patent: Mar. 28, 2000

[54] MULTISENSOR ROTOR FLEXURE MOUNTING

[75] Inventor: Robert E. Stewart, Woodland Hills, Calif.

[73] Assignee: Litton Systems Inc., Woodland Hills, Calif.

[21] Appl. No.: 09/127,095

[22] Filed: Jul. 31, 1998

[51] Int. Cl.⁷ ................................................ G01P 9/04
[52] U.S. Cl. .................................. 73/504.04; 73/504.12
[58] Field of Search .............................. 73/504.04, 510, 73/504.12; 310/321

[56] References Cited

U.S. PATENT DOCUMENTS 5,065,627  11/1991  Stewart et al. ...................... 73/504.04

*Primary Examiner*—John E. Chapman
*Attorney, Agent, or Firm*—Elliott N. Kramsky

[57] ABSTRACT

A flexure assembly is provided for coupling and electrically interconnecting the rotors of an inertial multisensor. The rotor assembly is fixed to the base of the multisensor by means of a plurality of outer ring segments that attach to the base. An inner coupling ring is attached at its top and bottom surfaces to trapezoidal spring connectors associated with the rotors. Drive assemblies, each including a pair of radially-directed vanes with paired piezoelectric elements fixed to opposite vane surfaces, are fixed to each rotor. The vanes are connected by trapezoidal connector pieces, which, in turn, connect to the outer ring segments bolted to the base. Radial flexure springs, along with the vanes, are joined to central rotor hubs. Rotor arms also radiate from the rotor hubs. The stiffness of the flexure springs substantially sets the resonant frequency of the coupling flexure assembly that includes the counter-oscillating rotors. Momentum transfer between the rotors is facilitated by the inner ring, which acts as a node, relative to which the rotors counter-oscillate at a common resonant frequency.

22 Claims, 7 Drawing Sheets

MULTISENSOR ROTOR FLEXURE MOUNTING

BACKGROUND OF THE INVENTION

1. Field of the Invention

The present invention relates to inertial multisensor navigation units (IMU's) for short range, relatively low-accuracy guidance applications, such as munitions. More particularly, this invention pertains to a flexure for use in a multisensor of the type that employs paired triads of accelerometers mounted on counter-oscillating platforms for directly measuring linear accelerations and for determining rotation rates with respect to a three-axis system from Coriolis accelerations.

2. Description of the Prior Art

Multisensors measure space-dependent accelerations and rotation, or angular, rates with respect to orthogonal space axes. Their design is beset by numerous complexities, as it requires the simultaneous measurement of six independent variables. For example, gyroscopes of the ring laser and fiber optic type require a lasing cavity dedicated to each input axis. This mandates a total of three lasing cavities, an expensive undertaking, to obtain three of the six required measurements. (An example of a laser device for measuring rotation about three axes is shown in U.S. Pat. No. 4,795,258 of Graham Martin, property of the assignee herein, entitled "Nonplanar Three-Axis Ring Laser Gyro With Shared Mirror Faces".) Multisensors employing spinning wheel gyros must deal with their limitation to measurement of rotation with respect to two axes, necessitating the use of an additional drive and servo or capture mechanisms for a third and fourth (redundant) input axis. Again, this does not in any way account for the additional complexity introduced by the remaining measurements of accelerations.

Simplicity and economy are particularly significant in the design of multisensors for munitions guidance and like applications. Such uses are characterized by non-reusable payloads, limited flight durations and only moderate accuracy requirements. One economical type of system for measuring both rotation rates and linear acceleration with reference to a set of three orthogonal axes is a multi-sensor mechanism taught in a series of United States patents, also the property of the assignee herein: (Ser. Nos. 4,996,877, entitled, "Three Axis Inertial Measurement Unit With Counterbalanced Mechanical Oscillator"; 5,007,289, entitled, "Three Axis Inertial Measurement Unit With Counterbalanced, Low Inertia Mechanical Oscillator"; and 5,065,627 entitled, "Three Axis Inertial Measurement Unit With Counterbalanced, Low Inertia Mechanical Oscillator".) The teachings of these patents are incorporated herein by this reference. The devices disclosed in the above-referenced patents employ piezoelectric drive mechanisms to drive a pair of counterbalanced platforms to oscillate out-of-phase about a common axis within a housing or case. Accelerometers, housed in a vacuum to avoid the effects of gas damping, are mounted at tilted attitudes (for measuring variables in orthogonal planes) with respect to radially-directed elements of the platforms to provide measures of both linear acceleration and rotation. The latter (rotation) values are derived from the (Coriolis) forces sensed by the accelerometers at the resonant frequency of the counter-oscillating structure.

The oscillatory motions of the rotors of the multisensors taught by the above-identified patents are coupled to one another through the case that houses the mechanism. Each rotor comprises three radially-directed rotor arms. An accelerometer is fixed to each rotor arm. The rotor arms alternate with rotor platforms, each including three radially-directed webs. Piezoelectric elements are mounted to each side of the two outer webs. The elements are appropriately-poled so that an input drive signal simultaneously induces compression and tension at the opposite surfaces to cause predetermined bending of the webs to produce oscillation of the rotors. The central web is relatively stiff, providing the major factor for determining the natural or resonant frequency of the rotor.

Each rotor is bolted exclusively to the case for support, whereby the case provides the sole path of energy transfer between the oscillating rotors. As mentioned earlier, measurement of rotation rate through sensing Coriolis acceleration relies upon the demodulation of an output signal whose frequency is equal to the resonant frequency of the paired rotors, with a single resonant frequency assumed. The above-described design is subject to factors that can complicate the measurement of rotation rate to a significant extent. Some complications follow from the only-indirect coupling of energy (i.e., through the case) between the paired rotors.

Numerous arrangements may act to weaken the already-indirect coupling of energy. For example, many multisensor applications require hard-mounting of the case to a body. In such arrangements, the mechanical impedance of the outside world is introduced into the rotor coupling so that the transfer of energy between the oscillating rotors is subject to attenuation in complex, and sometimes-unforeseen, ways. Thus, the accuracy of rotation rate measurement can vary as a function of application and changes in mechanical impedance.

Solutions to problems relating to such weakly-coupled rotors, for overcoming energy leakage as well as problems related to differential rotor frequencies are quite complex and often expensive to implement. One solution, adjusting the relative amplitudes of the rotor drive voltages, can introduce bias effects, complicate system electronics, etc. Another solution is to mount the multi-sensor case on isolators so that the device is no longer hard-mounted to the outside world. While essentially solving the problems of external impedances, isolation-mounting multiplies mechanical complexity, size and cost, often to a significant extent.

Pending U.S. patent application Ser. No. 08/904,927, also property of the assignee herein, entitled "Multisensor with Directly Coupled Rotors," addresses the above-described problems of multisensor arrangements in which oscillatory energy is coupled through the case by providing a multisensor in which the opposite ends of a shaft-like torsion spring are fixed to the centers of rotation of the aligned rotors. The axis of the torsion spring thereby lies coincident with the common axis of rotation of the rotor pair.

While offering the advantage of direct transfer of energy from rotor to rotor, the fabrication of such a device is difficult. Precise alignment of the axis of the shaft-like torsion spring is necessary to assure that the two rotors counter-oscillate in parallel planes. This can be a particularly difficult task, as the rotors are mounted not only to each other through the torsion spring, but are also mounted to the case through associated flexures. Should the rotors joined by the common torsion spring be even slightly out of alignment, tension and compression forces thereby introduced into those flexures will affect the resonant frequency of the device and act as a source of bias error. Very high precision, complex assembly processes and skilled technicians are required to install the rotor-and-flexure arrangement, further increasing cost.

SUMMARY OF THE INVENTION

The preceding and other shortcomings of the prior art are addressed by the present invention, which provides, in a first aspect, a multisensor that includes a substantially planar mounting base having a floor. An upper and a lower rotor are provided, each rotor including a central rotor hub having a bore and at least one radially-directed arm having a distal end. The rotors are aligned along a common central axis.

An accelerometer is fixed adjacent to the distal end of each arm. Means are coupled to each rotor for rotationally oscillating the rotor about the common central axis. The rotors are arranged to counter-oscillate with respect to one another about the axis. The means for oscillating includes at least one radially-directed planar spring fixed to the hub of the rotor. Each such spring has a distal end.

Means are provided for inducing flexure of the spring in response to an electrical signal. A ring is fixed to the distal ends of the radially-directed springs and means are provided for coupling the means for oscillating the rotors to the mounting base.

In a second aspect, the invention provides apparatus for coupling a pair of rotors, each having a hub with a bore therethrough on a common central axis to one another for relative counter-oscillation about the axis. Such apparatus includes a radially-extending rotor driver attached to the hub of each rotor. Each driver has a spring part and a driver part.

Means are associated with each driver for causing the hub of the associated rotor to oscillate rotationally about the common central axis 180 degrees out-of-phase with the hub of the other rotor in response to an applied electrical signal. Means, located in an equatorial plane between the rotors, are provided for coupling the drivers to each other across the plane in pairs and for mounting the coupled pairs of drivers to the base. Finally, means are provided for electrically connecting the rotors to the outside elements through the hubs of the rotor and the base.

The foregoing and other features and advantages of this invention will become further apparent from the detailed description that follows. This description is accompanied by a set of drawing figures. Numerals of the drawing figures, corresponding to those of the written description, point to the various features of the invention. Like numerals refer to like features throughout both the written description and the drawing figures.

DETAILED DESCRIPTION OF THE PREFERRED EMBODIMENTS

Figure 1A:
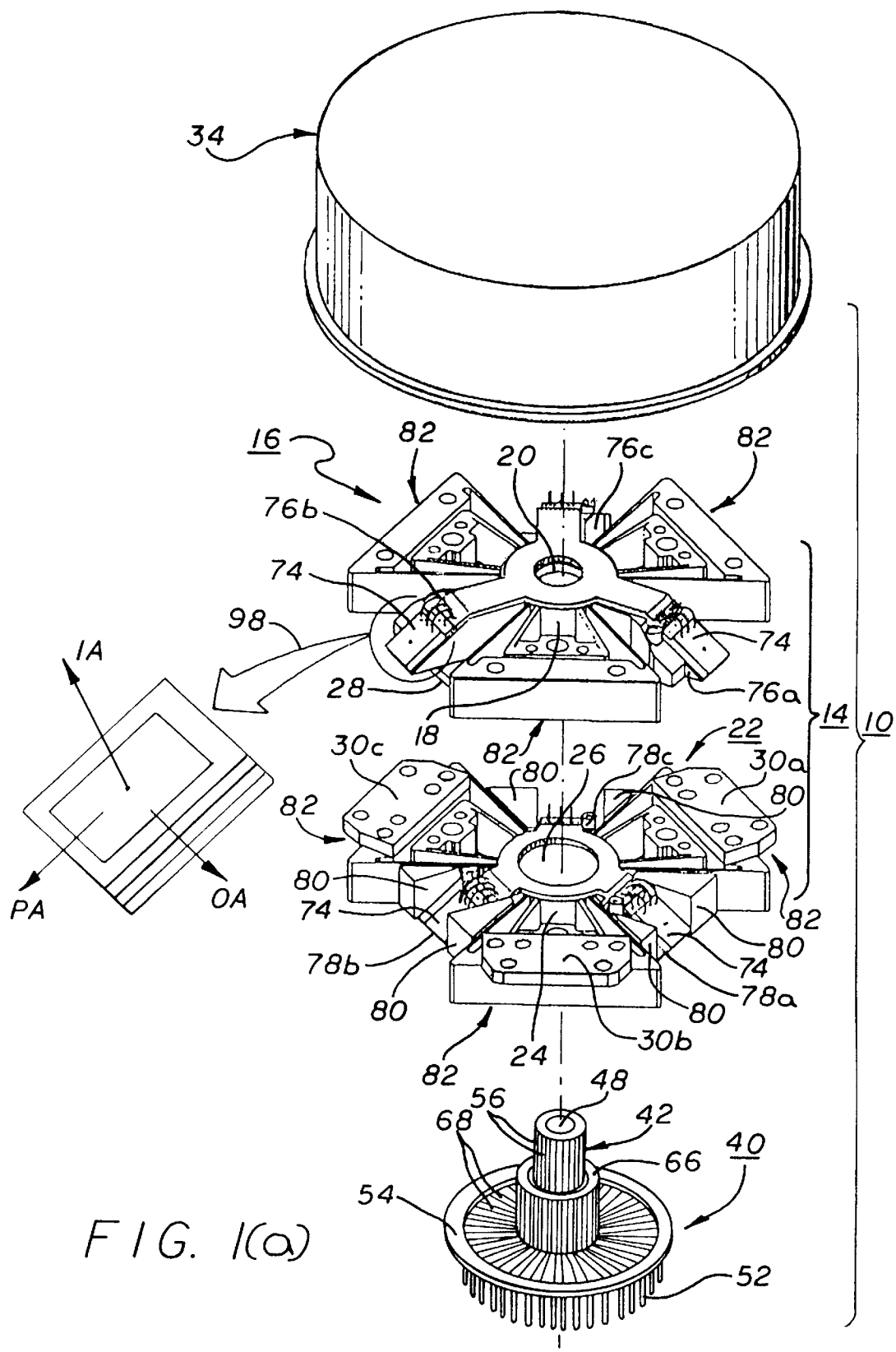
FIGS. 1(a) and 1(b) are an exploded perspective view of a counterbalanced multisensor in accordance with the present invention.
Figure 1B:
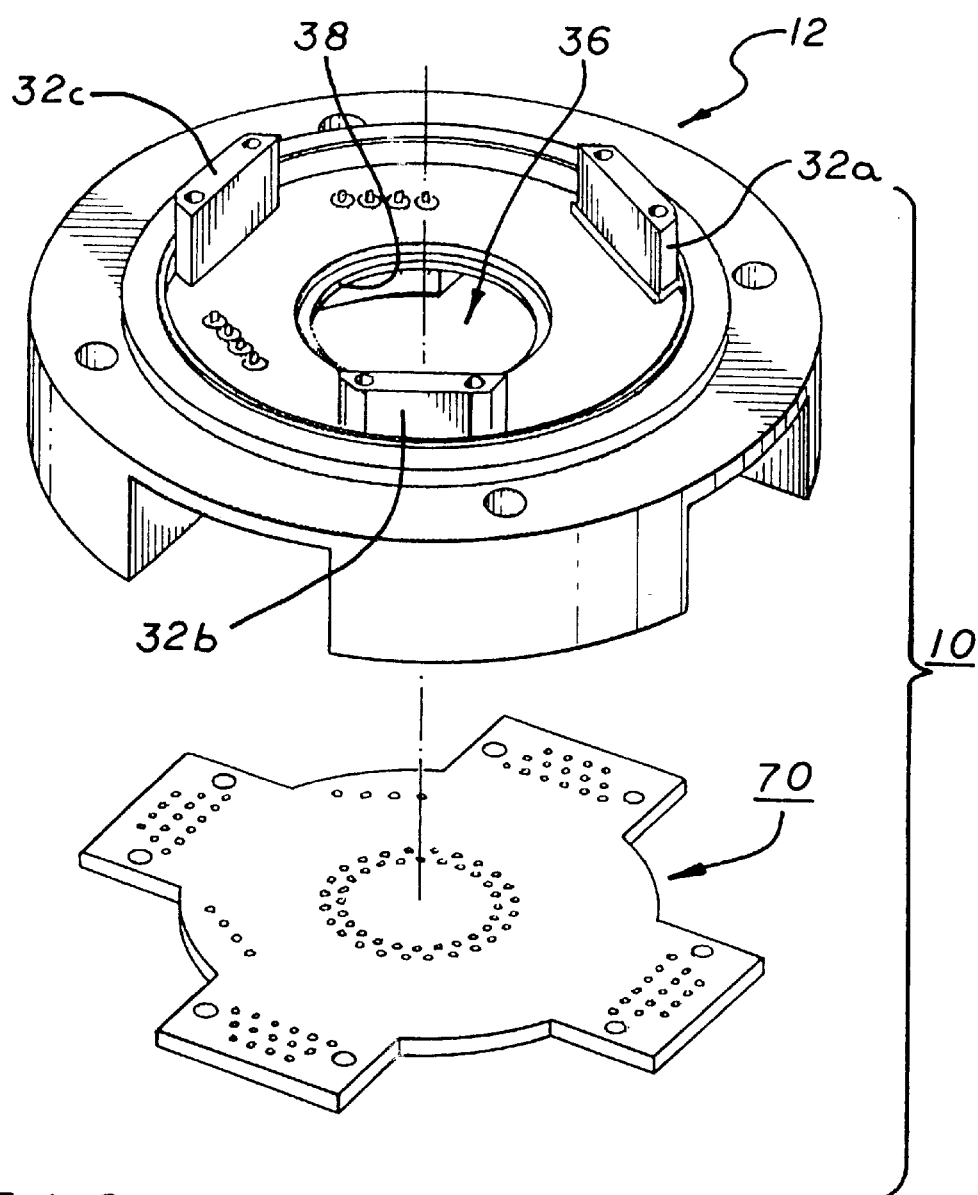

FIG. 1 is an exploded perspective view of a counterbalanced multisensor 10 in accordance with the invention. In the description of this and other FIGS. that follows, reference to features visible most clearly in other figures may occasionally be made. In such cases, the reader's attention will be temporarily directed to the appropriate figure.

The principal components and arrangements of the invention may be seen to include a substantially-planar mounting base 12 that serves both to mount various multisensor mechanisms, while providing a means for mounting the multisensor assembly 10 to another body (not illustrated).

The multisensor 10 includes a rotor assembly 14, comprising an upper rotor 16 having a central hub 18 with a central bore 20 and a lower rotor 22 having a central hub 24 with a somewhat-larger central bore 26. The rotors 16 and 22 are mechanically coupled to one another for counter-oscillation at a common frequency about a common central axis by means of an inner coupling ring 28 and a plurality of outer ring segments 30a, 30b and 30c, all of which lie in an common equatorial plane midway between the rotors 16 and 22 and are clamped between the upper and lower rotors 16 and 22 by means of conventional fasteners (not shown). The segments may be alternating fixed to the rotors 16, 22 by laser welding or like processes.

In the illustrated embodiment, the three outer ring segments 30a, 30b and 30c are positioned equilaterally, i.e., 120° apart. Each of the ring segments 30a, 30b and 30c includes a portion that extends beyond the peripheries of the rotors 16 and 22 to overlie a plurality of corresponding bosses, or standoffs, 32a, 32b and 32c, respectively, that extend upwardly from the floor of the mounting base 12. The rotor assembly 14 is aligned with and firmly mounted to the base 12 by means of conventional fasteners (not shown) extending through the ring segments 30a, 30b and 30c and into the standoffs 32a, 32b and 32c, respectively. Again, laser welding or like processes may be employed to fix the rotor assembly 14 to the base 12. A cover 34 is attached (e.g., by laser welding, resistance seam welding or like process), to the mounting base to enclose the rotor assembly 14.

Figure 3A:
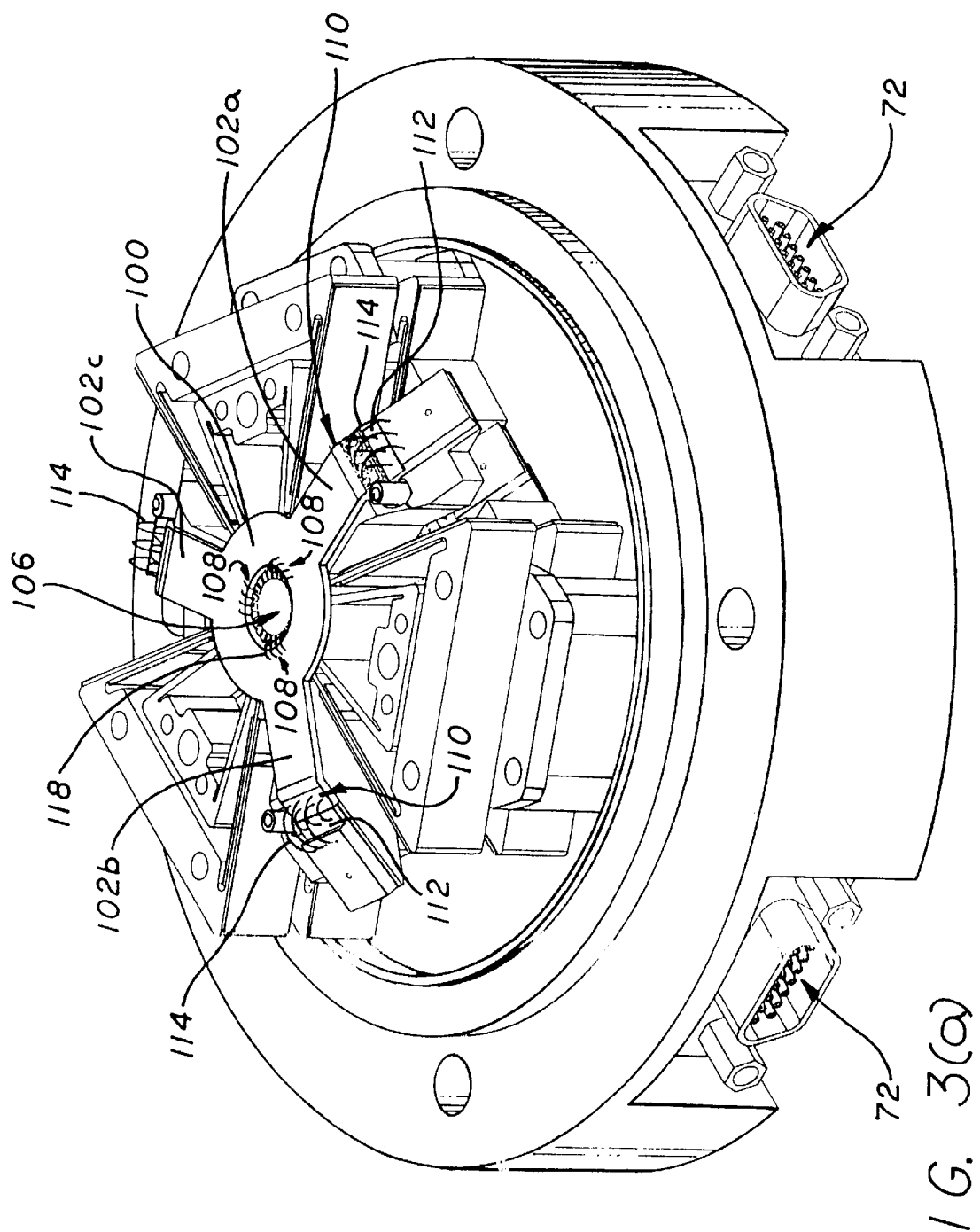
FIGS. 3(a) and 3(b) are perspective (with cover removed), and cross-sectional side elevation views respectively (taken at line 3(b)—3(b) of FIG. 1) of the invention, respectively.
Figure 3B:
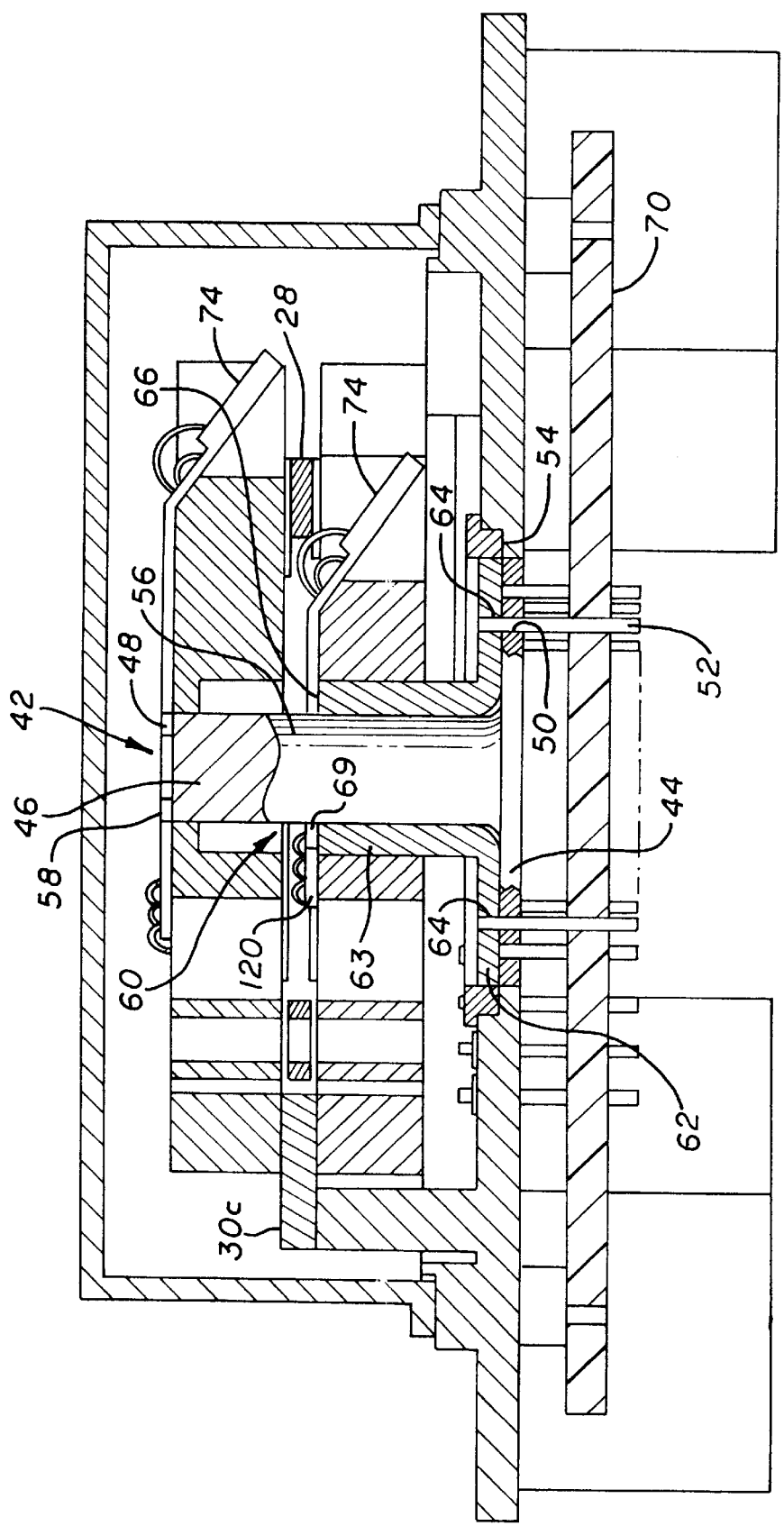

The mounting base 12 includes a central aperture 36 centered on the central axis of the rotors 16 and 22 while a concentric counterbore 38 extends into its upper surface. A two-part ceramic lead guide 40 extends concentrically upward through the aperture 36. Referring to FIG. 3(b), the lead guide 40 includes a center post 42, preferably of alumina (i.e., $AlO_2$), and includes a flanged base 44 and a solid cylindrical strut 46 that extends upwardly from the flanged base 44. The strut 46 terminates in a planar, circular upper end 48 (FIG. 1).

The flanged base 44 of the center post 42 has a plurality of metal-plated holes 50 that are arrayed in a circular pattern around the solid strut 46. Each hole 50 has a conductive feed-through pin 52, preferably gold-plated. The pin 52 is sealed in its associated pinhole 50 by appropriate means (e.g., by brazing) to ensure that each pinhole-pin pair is hermetically sealed. Returning to FIG. 1, a metal, preferably KOVAR, ring 54, or other low coefficient-of-expansion metal, is received in the counterbore 38. The center post 42 of the lead guide 40 includes a first plurality of plated-on conductive paths 56 that extend radially inward from the feed-through pins 52 in the flanged base 44 and thence up the surface of the solid strut 46 to the planar upper end 48 to terminate in a connection pad 58.

An end-flared sleeve 60 slips over and is bonded to the flanged base 44 and the strut 46 of the center post 42. The sleeve 60 has a flared skirt 62 that corresponds to and overlies the flanged base 44 of the center post 42 and an upstanding neck 63 that corresponds to the solid strut 46 of the center post 42. As in the case of the center post 42, it is made of a non-conductive ceramic material. Referring back to FIG. 3(b), the skirt 62 has a plurality of apertures 64, some of which are aligned with the pinholes 50 of the flanged base 44 of the center post 42 for receiving the conductive pins 52. The neck 63 of the sleeve 60 terminates in a planar, annular upper end 66 intermediate the height of the strut 46 of the center post 42. The sleeve 60 has second plurality of conductive paths 68 plated on its outer surface that extend radially inward across the skirt 62 of the sleeve 60 from the feed-through pins 52, and, thence, up the surface of the sleeve 60 in a direction parallel to the central axis, to the upper end 66 of the sleeve 60, where they each terminate in a connection pad 69. The two separate, electrically isolated sets of conductive paths 56 and 68 of the lead guide 40, when appropriately connected (e.g., by soldering) to selected ones of the feed-through pins 52, enable convenient and efficient routing of electrical signals to and from the rotors 16 and 22 through the hermetically sealed base 12 to external signal sources and sensors.

In the preferred embodiment of FIG. 1, a printed circuit board 70 is shown connected, e.g., by soldering, to the plurality of feed-through pins 52 on the underside of the mounting base 12. The circuit board 70 mounts and interconnects a variety of electrical control elements (e.g., preamplifier electronics for use with the output signals of servo-controlling accelerometers fixed to the rotors 16 and 22). The circuit board 70 may, in turn, interconnect with external electronics by means of multi-pin connectors 72 located on the side of the mounting base 12 as illustrated in FIG. 3(a).

Both low frequency linear and resonant frequency accelerations are sensed by responsive mechanical apparatus. Planar, pendulous-mass linear accelerometers 74 are each mounted at an angle, relative to the parallel planes of the upper and lower rotors 16 and 22, adjacent a distal end of radially-directed arms 76a, 76b and 76c that extend from the central hub 18 of the upper rotor 16, and arms 78a, 78b and 78c (refer to FIG. 3(b)) that extend radially from the central hub 24 of the lower rotor 22.

Each of the accelerometers 74 mounted on the lower rotor 22 is mounted such that it is substantially parallel with a corresponding accelerometer 74 on the upper rotor 16. The arms of the lower rotor 22 are shorter than the corresponding arms of the upper rotor 16, to permit the set of accelerometers on the lower rotor 22 to be positioned such that, when the two rotors 16 and 22 are assembled together in a static condition, the input axes of corresponding pairs of accelerometers lie along a common axis orthogonal to their inertial planes (as best shown in FIG. 3(b) below).

Those skilled in the art will recognize that, since the arms of the lower rotor 22 are shorter than those of the upper rotor 16, their respective moments of inertia about the central axis will be different. As it is highly desirable that the rotors 16 and 22 counter-oscillate at a single, resonant frequency, compensating elements 80 are provided on either side of each of the respective lower rotor arms. The masses and locations of the compensating elements 80 are configured such that the moment of inertia of the lower rotor 22 is substantially the same as that of the upper rotor 16.

Radially-directed rotor drivers 82 extend from the respective central hubs 18 and 24 of each of the upper and lower rotors 16 and 22. The drivers 82 are interposed equilaterally with the radially-directed rotor arms of the upper and lower rotors 16 and 22.

Figure 4A:
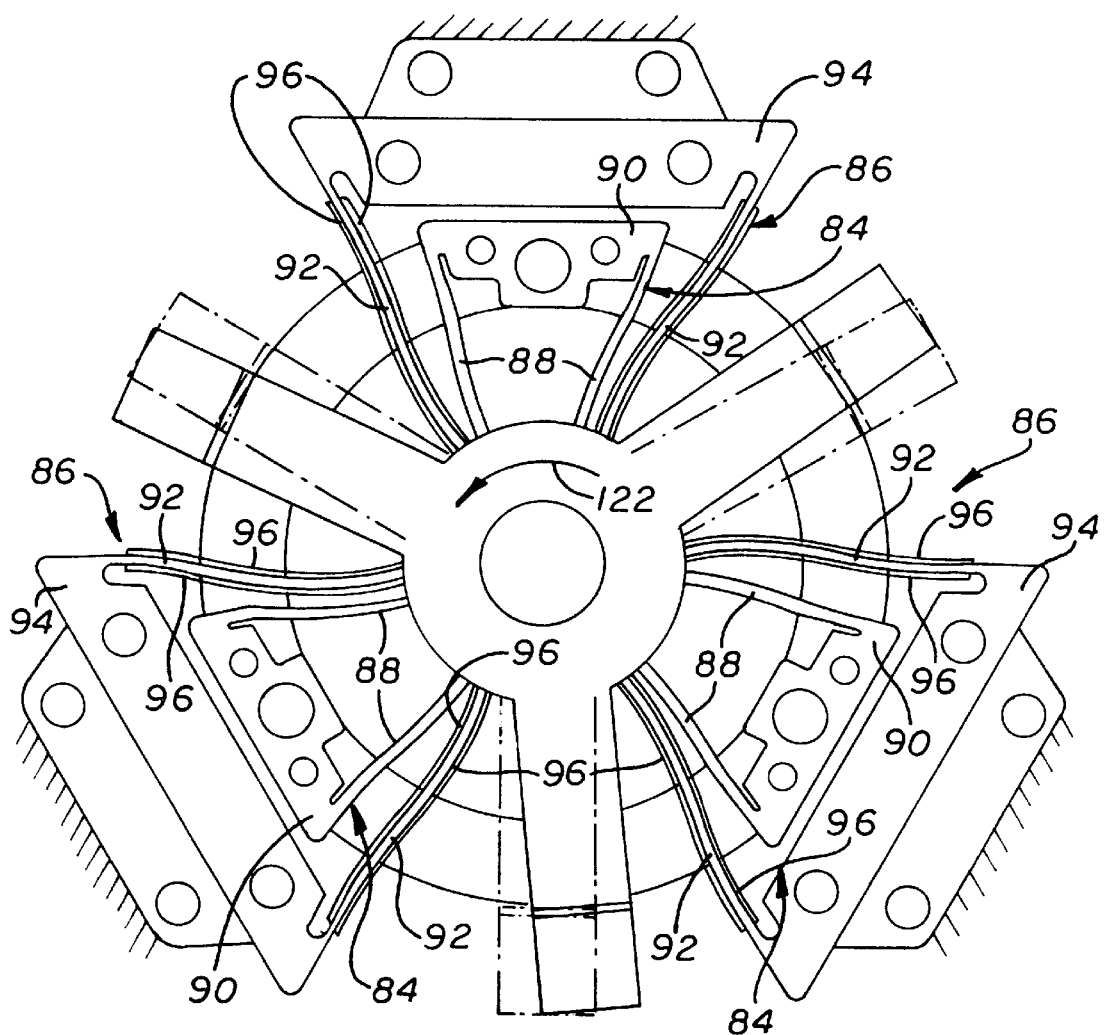
FIGS. 4(a) and 4(b) are top planar views of rotors illustrating the simultaneously-occurring configurations (deflections and displacements of elements) in operation.
Figure 4B:
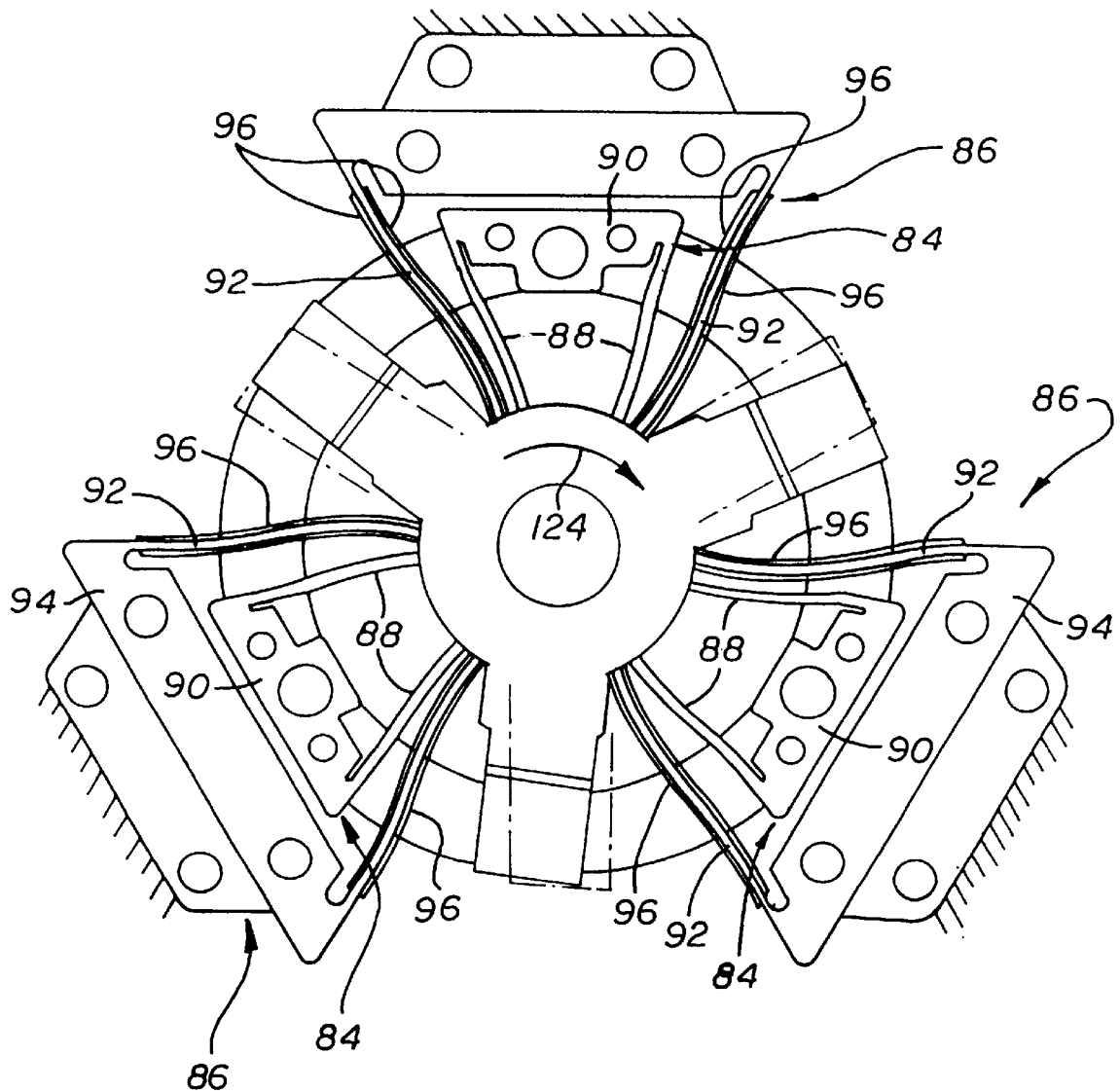

Referring now to FIGS. 4(a) and 4(b) which illustrate top planar views of the rotors 16 and 22 respectively, represen-tative rotor driver 82 may be seen to comprise a spring part 84 nestled within a driver part 86. The spring part 84 comprises a pair of radially-directed, stiff, planar springs 88 that extend from the associated rotor hub. The springs 88 have distal ends that are connected by means of a trapezoidal-shaped connector piece 90. The springs 88 are sized and arranged to be the dominant factor in setting the resonant frequencies of the counter-oscillating rotors 16 and 22, and, as described below, the spring parts 84 of the rotors 16 and 18 are coupled to one another in pairs across an equatorial plane midway between the two rotors by means of fasteners passing through their respective connector pieces 102 and the inner coupling ring 28.

The driver part of each rotor driver 82 similarly comprises a pair of planar, radially-directed driver vanes 92 that extend from an associated rotor hub. As in the case of the springs 88, the driver vanes 92 have distal ends that are connected by means of a trapezoidal-shaped connector piece 94. As referenced above, the connector pieces 94 of corresponding driver parts on the upper and lower rotors 16 and 18 interact with the interleaved outer ring segments 30a, 30b and 30c to couple corresponding upper and lower rotor drivers 82 together in pairs across the equatorial plane, and to mount the assembled rotor assembly 14 rigidly to the mounting base 12 by means of the standoffs 32a, 32b and 32c.

In operation, counter-oscillatory movements of the rotors 16 and 18 with respect to the common central axis result from forces applied to the driver vanes 92 of the rotor drivers. Such forces are induced by the application of dither drive voltages to selected pairs of piezoelectric elements 96 fixed to opposite sides of the driver vanes 92, and are sensed by the detection of voltages generated by other selected pairs of the elements 96. Specifically, two of the drivers 82 in each of the rotors 16 and 18 has a pair of driving elements 96 fixed to opposite sides of its vanes 92, and one of the drivers 82 in each of the rotors 16 and 18 has a pair of pickoff elements 96 fixed to opposite sides of its vanes 92.

The pairs of driving piezoelectric elements 96 fixed to the opposed surfaces of the vanes 92 of the drivers 82 alternately extend and contract in response to the applied dither drive voltages, causing the vanes 92 to which they are attached to bend, or flex, and thereby impart a reactive torque on the respective hub to which they are attached. As a result, the rotor arms fixed to that hub (and the accelerometer triads mounted thereon) rotate, while voltages generated by the pickoff elements 96 attached to the reactively flexing vanes 92 of the third driver 82 produce a pickoff feedback signal proportional to the amount of flexure in their associated vanes 92 for use in regulating the amplitude of oscillation.

The desired 180° out-of-phase oscillatory relationship between the rotors 16 and 22 may be accomplished through a number of arrangements, including the application of out-of-phase drive signals to the elements 96 of corresponding vane-pairs of the opposed rotors 16 and 18, as well as by affixing oppositely-poled elements 96 to the surfaces of corresponding vane-pairs of the rotor pair, and applying identical drive voltages to them.

Returning to FIG. 1, an enlarged view of a representative accelerometer that is fixed to the arm 76b of the upper rotor 16 is identified and located by means of the call-out arrow 98. An orthogonal coordinate system is superimposed on the accelerometer for indicating various axes, the significance of which will become more apparent below. An axis denoted "OA" (output axis) is aligned parallel to the hinge axis of the accelerometer 74. This axis is perpendicular to an axis "PA" (pendulous axis) that passes through the center of gravity in the plane of the pendulous mass of the accelerometer. An input axis "IA" is perpendicular to the plane of the axes OA and PA.

Figure 2A:
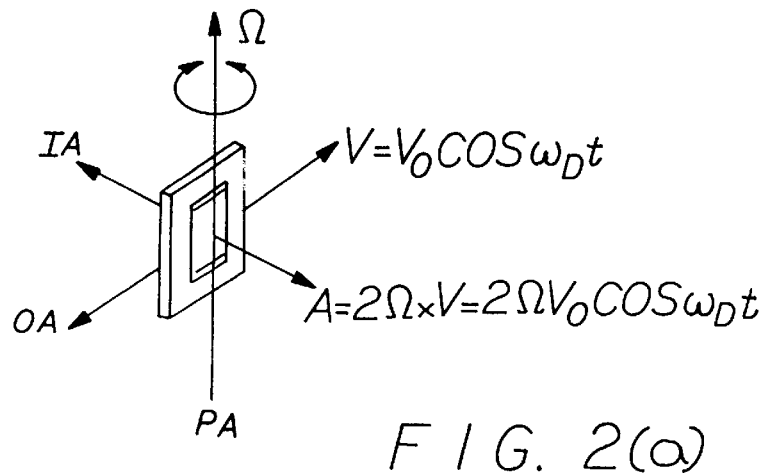
FIGS. 2(a) and 2(b) are schematic views of an accelerometer, and of the counter-oscillatory structure, respectively, of a counterbalanced multisensor.
Figure 2B:
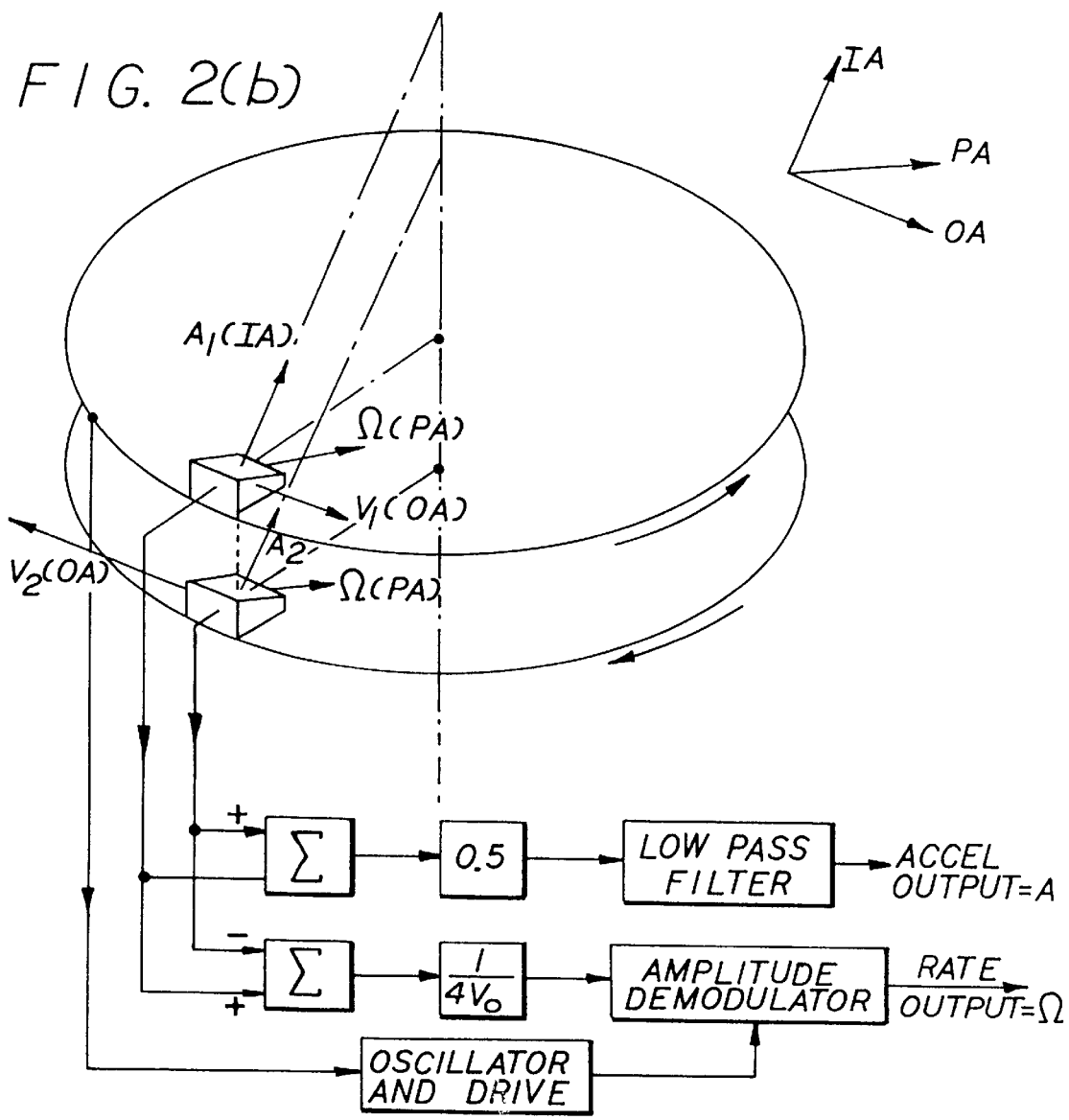

The theory of operation of a counterbalanced multisensor will be discussed with reference to FIGS. 2(a) and 2(b), each of which provides a schematic view in perspective of a central aspect of the system. In FIG. 2(a), there is illustrated a representative accelerometer, with axes and vectors marked thereon indicative of a Coriolis acceleration output. FIG. 2(b) schematically illustrates the operation of a pair of such accelerometers within the counter-oscillating system of a multisensor.

In such a system, six batch fabricated linear accelerometers permit complete measurement of the linear acceleration and angular rate of a host vehicle in body-fixed coordinates by making direct measurements of total acceleration with respect to the body axes. The linear and Coriolis components of the total acceleration are then segregated, and the latter component operated on by demodulating it to determine body angular rates.

Referring specifically to FIG. 2(a), Coriolis acceleration is measured as the cross product $\overline{A}_C = 2\overline{\Omega} \times \overline{V}$, where $\overline{\Omega}$ is the body angular rate vector, and $\overline{V}$ is the instantaneous relative velocity of the accelerometer with respect to the host vehicle. Thus the accelerometer, when set in motion with a relative velocity in the direction of the output axis OA, permits an angular rate about the pendulous axis PA to be observed as part of an acceleration measured along the input axis IA. The Coriolis acceleration measurement thus permits angular rate $\Omega$ to be observed with the linear accelerometers of the multisensor. A procedure is then required for separating the linear and Coriolis acceleration components from one another.

One approach to such separation is to induce a sinusoidal relative velocity in the form $$\overline{V} = \overline{V}_o \sin \omega t \qquad (1)$$

The corresponding Coriolis acceleration is then $$\overline{A}_c = 2\overline{\Omega} \times V_0 \sin \omega t \qquad (2)$$

Thus, as long as no additive linear acceleration produces a component within the frequency band of the velocity excitation frequency, then demodulation at $\omega_D$ of the accelerometer's output yields a measurement of angular rate about the PA axis of (each) accelerometer. Similarly, the low frequency linear acceleration component is obtained by a low-pass filtering operation. As mentioned earlier, linear accelerations usually occur at very low frequencies, while the angular velocity is modulated with a much higher frequency $\omega_D$.

Referring now to FIG. 2(b), the accelerometers are oriented with their input axes inclined with respect to their corresponding planes of motion to move at 180° out of phase with one another on the counter-vibrating rotors 16, 18. In the presence of an angular rate $\Omega$ along PA, and an acceleration component A along IA (see FIG. 2(a)), the total acceleration measured by each is:

$$A_1 = A + 2\Omega V_0 \qquad (3)$$

$$A_2 = A - 2\Omega V_0 \qquad (4)$$

Thus, $$A = \tfrac{1}{2}(A_1 + A_2) \qquad (5)$$

and $$\Omega = (\tfrac{1}{4}V_0)(A_1 - A_2) \qquad (6)$$

A more accurate procedure for obtaining $\Omega(t)$ is derived from the general relations $$A_1(t) = A(t) + 2\Omega(t)V_0 \sin \omega t + e_1(t) \qquad (7)$$

$$A_2(t) = A(t) - 2\Omega(t)V_0 \sin \omega t + e_2(t) \qquad (8)$$

where $e_1(t)$ and $e_2(t)$ are high-frequency vibration effects that may be considered as error terms. Upon elimination of A(t), the following relation results $$\Omega(t)\sin \omega t = (\tfrac{1}{4}V_0)[A_1(t) - A_2(t)] - (\tfrac{1}{4}V_0)[e_1(t) - e_2(t)] \qquad (9)$$

Assuming that none of the structural natural frequencies of the multisensor is close to the modulated band of $\Omega(t)$, then $e_1(t)$ and $e_2(t)$ basically cancel one another, leaving the following expression for $\Omega(t)$:

$$\Omega(t)\sin \omega t = (\tfrac{1}{4}V_0)[A_1(t) - A_2(t)] \qquad (10)$$

Referring again to FIGS. 3(a) and 3(b), in combination, such views illustrate the electrical connection of accelerometers 74 of the rotor assembly 14. As described above, a first plurality of circuit paths 56 are brought from the feedthrough pins 52, up the surface of the strut 46 and through the central bores 20 and 26 of the central hubs 18 and 24 of the upper and lower rotors 16 and 18, respectively, to the upper end 48 of the strut 46, which is disposed at the same level as the upper surface of the upper rotor 16, where they terminate in a group of the connection pads 58.

A thin, integral wiring board of a material commercially available as "FLEXPRINT" is fixed by means of adhesive to the upper surface of the upper rotor 16. FLEXPRINT typically comprises one or more layers of a thin, dielectric material, typically a polyamide, of a type commercially available under the name "KAPTON," a trademark of the Dupont Corporation, that encapsulate a predetermined lead pattern comprising one or more, for example, traces of copper or an alloy thereof.

The integral wiring board comprises an annular hub segment 100 that overlies the hub 18 of the upper rotor 16. Arm segments 102a, 102b and 102c, each overlying one of the arms 76a, 76b and 76c, respectively, of the upper rotor 16, radiate from the hub segment 100. The hub segment 100 has a central aperture 106 surrounded by a plurality of exposed connection pads 108. The aperture 106, in turn, exposes the group of corresponding adjacent connection pads 58 located on the upper end of the strut 46. Each arm segment 102a, 102b and 102c extends radially along a corresponding arm 76a, 76b and 76c, respectively, to terminate adjacent the accelerometer 74 affixed to the distal end of that arm.

The distal end of each arm segment 102a, 102b and 102c has a connection pad 110 exposed on its upper surface located adjacent a corresponding connection pad 112 located on the adjacent accelerometer. Service loops 114 of conductive wire, preferably gold or aluminum, are attached (e.g., by thermal compression or wire bonding), to the adjacent connection pads 110, 112. Such electrical connection enables the signals output from the accelerometers to be conducted by means of the arm segments 102a, 102b and 102c to the pads 108 surrounding the central aperture 106 of the hub segment 100. A second set of service loops 118 interconnects corresponding pairs of the pads 108 to the connection pads 58 located on the upper end 48 of the strut 46. This enables the output signals from the accelerometers to be carried down the conductive paths 56 on the strut 46 of the center post 42 to the feed-through pins 52 located in the flanged base 44, and, thence, out through the mounting base 12, as previously described.

The use of the sets of service loops 114 and 118, particularly those adjacent to the center post 42, enables a slight displacement of adjacent parts, such as the rotor hub 18 and the center post 42, relative to one another without breaking or interrupting the signal paths therebetween.

Similar relationships are employed to provide electrical interconnection to the lower rotor 22. A second integral wiring board 120 interconnects the outputs of the accelerometers 74 of the lower rotor 22 with the sleeve 60. Again, the integral wiring board 120 comprises an annular hub segment corresponding to the hub 24 of the lower rotor 22 and arm segments corresponding to the arms of the lower rotor 22. The hub segment has a central aperture surrounded by a plurality of exposed connection pads in the manner of and in correspondence to the integral wiring board of the upper rotor 16 illustrated above. Such aperture exposes a group of corresponding adjacent connection pads located on the upper end 66 of the sleeve 60. Each arm segment extends radially along its corresponding arm to terminate adjacent the accelerometer affixed to the distal end of that arm.

As mentioned above, similar arrangements pertain to the lower rotor 22. The distal ends of the arm segments of the lower rotor 22 have a plurality of connection pads exposed on their upper surfaces adjacent the plurality of corresponding connection pads located on the adjacent accelerometer. A third set of service loops of conductive wire are attached to corresponding pairs of the adjacent connection pads on the accelerometers and their associated arm segments. This connection enables the output signals of the accelerometers of the lower rotor 22 to be conducted to the pads surrounding the central aperture of the hub segment. A fourth set of service loops then interconnects corresponding pairs of the connection pads to the connection pads located on the annular upper end 66 of the neck 62 of the sleeve 60. This enables the output signals of the accelerometers on the lower rotor 22 to be carried down the plurality of conductive paths 68 on the sleeve 60 to the feed-through pins 52 located in the flanged skirt 62, and, thence, out through the mounting base 12, as previously described.

Referring to FIGS. 4(a) and 4(b) together, (and with particular reference to the upper rotor 16, it being understood that like structures obtain with regard to the lower rotor 22) six pairs of piezoelectric elements 96 are fixed, one pair to each vane 92 in each of the three radially-directed rotor drivers 82 of the upper rotor 16. The operation of such elements, discussed above with reference to FIG. 1, will be further illustrated and discussed below.

Referring to FIG. 3(b), the outer ring segment 30c is disposed midway between the lower surface of the upper rotor 16 and the upper surface of the lower rotor 22 to provide an equatorial mounting of the rotor assembly 14. Similarly, the inner coupling ring 28 lies in the same equatorial plane as the outer ring segment 30c. Such an equatorial coupling and mount advantageously assures both a balanced internal mechanical coupling of the rotor components, as well as an inherently balanced mounting of the rotor assembly 14 to the mounting base 12, one that minimizes net moment transfer between the rotor assembly 14 and the base 12. As the rotor assembly 14 is internally counterbalanced (as a consequence of counter-oscillation of the rotors of substantially identical moments of inertia), little or no net torque should be transferred to the mounting base 12. Conversely, changes in the exterior impedance of a hard-mounted base have little, if any effect upon the counter-oscillatory mechanism of the multisensor 10. In this way, the somewhat greater operating voltages required, and the output bias variations encountered, with an unbalanced case mount are avoided.

Essentially, the circumferential mounting flanges defined by the outer ring segments 30a, 30b, and 30c are located in a region where the opposed moments transmitted from the counteracting rotor drivers 82 associated with each of the rotors 16 and 22 come closest to canceling one another (a "nodal" region, or band). Such mounting location acts to minimize net moment transfer from the rotor assembly 14 to the base 12 and thereby minimizes the sensitivity of the mounting to external mechanical impedance variations.

The rotor flexure of the invention will be described with reference to FIGS. 4(a) and 4(b), which illustrate simultaneously-occurring configurations of the upper and lower rotors 16 and 22, in operation. (Discussion of the operation of the multisensor with respect to FIGS. 4(a) and 4(b) will make reference to certain other elements of the invention shown only in the other preceding figures.)

Pairs of piezoelectric elements 96 are fixed to opposed surfaces of the six radially-directed driver vanes 92 associated with the upper and lower rotors 16 and 22. It is understood that the vanes 92 and associated piezoelectric elements 96 of one driver element 82 of each hub act as pickoffs. Induced flexing of the vanes 92 of such a pickoff driver element 82, resulting in the generation of a detectable voltage, is transmitted as a pickoff signal to control circuitry (not shown). Energy is supplied to the rotors 16 and 22 in the form of electrical signals for activating simultaneous extensions and contractions of the paired piezoelectric elements 96 fixed to opposite surfaces of the radially-directed driver vanes 92 of two remaining rotor drivers 82 of the upper and lower rotors 16 and 22. The distal ends of each pair of vanes 92 are constrained by the vane connector pieces 94 and the outer ring segments 30a, 30b, and 30c, which are rigidly affixed to the mounting base 12 through the standoffs 32a, 32b and 32c, respectively.

In the first half of a sinusoidal cycle, illustrated in FIG. 4(a), resultant bending of the vanes 92 in the upper rotor 16 applies a reactive torque on the hub 18 of the upper rotor 16 in a first direction indicated by the arrow 122, causing the hub 18 to rotate in that direction. In the same first half-cycle, illustrated in FIG. 4(b), resultant bending of the vanes 92 in the lower rotor 22 applies a reactive torque on the hub 24 of the lower rotor 22 in the opposite direction, indicated by the arrow 124 in FIG. 4(b), causing the hub 24 to rotate in that same, opposite direction.

Such counter-rotations of the respective hubs 18 and 24, of course, produce a corresponding rotation of the respective sets of arms 76a, 76b, and 76c, and 78a, 78b, and 78c, attached thereto (i.e., a displacement from the shadow outlines indicative of their aligned, static, or neutral, position).

In the second half of the cycle, the reversed flexure of the vanes 92 in the upper and lower rotors 18 and 22 produces an angular displacement of the respective foregoing elements in opposite directions, i.e., in directions reversed to those indicated by the arrows 122 and 124 in FIGS. 4(*a*) and 4(*b*).

In addition to rotating the associated hub and rotor arms (along with the accelerometers attached thereto), each half cycle oscillation of the hubs 18 and 24 produces a responsive deformation of the relatively stiff pairs of springs 88 in each driver 82. Without more, this would result in a corresponding rotation of the spring connector pieces 90 in the direction of the arrows 122 and 124. However, since the connector pieces 90 of the two rotors 16 and 22 are all coupled to each other by means of the inner coupling ring 28, and since the respective hubs 18 and 24 of the two rotors 16 and 18 are simultaneously applying opposite turning moments on corresponding pairs of springs 88, the net result is that spring connector pieces 90 and the inner coupling ring 28 remain stationary, as though the distal ends of the springs 88 were fixed, but without the need for connecting them directly to the base 12. The springs 88 thus act in a manner similar to those of a conventional, sinusoidally driven spring-mass system, i.e., to alternately store and release energy into the rotors 16 and 22, and to define their resonant frequency. As mentioned above, the flexure springs 88 are designed to be of sufficient stiffness to contribute about 80 percent of the total spring rate necessary to establish the resonant frequency of oscillation of the rotors 16 and 18.

Thus, it may be seen that the present invention provides a multisensor that includes an improved rotor coupling flexure assembly. As opposed to a device that relies upon a rod-like member for centrally connecting the rotors, the present invention employs a mechanical system that does not require precision-mounting. Rather, the design allows reliable assembly of readily repeatable quality by lesser skilled personnel employing jigs of only ordinary precision. Each of the principal elements (rotors, inner ring and outer ring segments) is substantially planar, and designed for mounting parallel to one another, in a bottom-to-top fashion from a single side of the mounting base. This again permits relatively simple, economical assembly methods and reduced manufacturing costs. Further, the mechanical system is rugged, minimizing maintenance. The equatorial mount provides protection against variations in external impedances and minimizes energy loss through the case.

While the invention has been described with reference to its presently preferred embodiment, it is not limited thereto. Rather, this invention is limited only insofar as defined by the following set of patent claims and includes within its scope all equivalents thereof.

What is claimed is:

1. A multisensor, comprising, in combination:
    a) a substantially planar mounting base having a floor;
    b) an upper and a lower rotor, including a central rotor hub having a bore therethrough and at least one radially-directed arm fixed to said hub and having a distal end;
    c) said rotors being aligned along a common central axis;
    d) an accelerometer fixed adjacent to said distal end of each said arm;
    e) means coupled to each said rotor for rotationally oscillating said rotor about said common central axis, said rotors being arranged to counter-oscillate with respect to one another about said axis;
    f) said means for oscillating each said rotor including at least one radially-directed planar spring fixed to said hub of said rotor, each said spring having a distal end;
    g) means for inducing flexure of said spring in response to an electrical signal;
    h) a ring fixed to said distal ends of said radially-directed springs; and
    g) means for coupling said means for oscillating said rotors to said mounting base.

2. A multisensor as defined in claim 1, wherein:
    a) each said rotor includes a pair of said radially-directed springs; and
    b) a connector piece joins said distal ends of said springs.

3. A multisensor as defined in claim 2, wherein said ring joins said spring-end connector pieces.

4. A multisensor as defined in claim 1, wherein said ring lies in an equatorial plane intermediate said upper and lower rotors.

5. A multisensor as defined in claim 1, wherein:
    a) said means for inducing flexure comprises at least one radially-directed vane fixed to said hub and having a distal end;
    b) means affixed to said vane for deflecting said vane in response to an electrical signal; and
    c) said means for coupling said means for oscillating said rotors further includes means for coupling said distal ends of said vanes to one another.

6. A multisensor as defined in claim 5, further comprising:
    a) a pair of said vanes; and
    b) a connector piece joining said distal ends of said pair of vanes to one another.

7. A multisensor as defined in claim 6, wherein said coupling means further comprises means for coupling corresponding vane-end connector pieces of said rotors to one another and to said base.

8. A multisensor as defined in claim 7, wherein said coupling means further comprises:
    a) a standoff extending upwardly from said floor of said mounting base;
    b) an outer ring segment attached to each said vane-end connector pair, said segment having a portion that extends radially beyond said rotors to overlie said standoff; and
    c) means for fastening said outer ring segment to said standoff.

9. A multisensor as defined in claim 8, wherein said outer ring segment lies in an equatorial plane intermediate said upper and lower rotors.

10. A multisensor as defined in claim 5, wherein said means for deflecting said vanes comprises piezoelectric elements fixed to opposite surfaces of said vanes.

11. A multisensor as defined in claim 1, further comprising:
    a) at least one radially-directed vane fixed to said hub of each said rotor; and
    b) means affixed to said vane for generating an electrical signal in response to a flexure of said vane.

12. A multisensor as defined in claim 11, wherein said means for generating a signal comprises at least one piezoelectric element affixed to a surface of said vane.

13. A multisensor as defined in claim 1, wherein each of said upper and lower rotors further comprises:
    a) three of said rotor arms;
    b) three pairs of radially-directed vanes fixed to said hub of said rotor;
    c) three pairs of said radially-directed springs, each of said pairs of springs being disposed within an associated one of said pairs of vanes to comprise a rotor driver; and d) said rotor arms and said rotor drivers being interposed with each other and symmetrically positioned about said hub.

14. A multisensor as defined in claim 1, further comprising means for electrically connecting elements on said rotors through said mounting base to elements external of said multisensor, said means comprising:
   a) said floor of said mounting base having a circular aperture centered on said central axis;
   b) a non-conductive post received in said aperture, said post having an upper surface, a circular, flanged base, and an upstanding cylindrical strut centered on said central axis and extending upwardly through said bores of said hubs of said rotors;
   c) said flanged base having a circular periphery, means around said periphery for sealing said flanged base of said post in said floor of said mounting base, and a plurality of upstanding conductive pins arrayed about said strut and extending through said flanged base;
   d) said strut having an annular lower step located generally coplanar with an upper surface of said lower rotor, and a planar upper end disposed generally coplanar with an upper surface of said upper rotor,
   e) a first plurality of conductive paths on said upper surface of said post, said paths extending radially inward across said flanged base from selected ones of said plurality of conductive pins, upwardly along said strut, and terminating in a plurality of connection pads on said upper end of said strut;
   f) a sleeve disposed concentrically about said post, said sleeve being made of a non-conductive material and having an upper surface, a flared skirt conforming to said flanged base of said post, and a neck conforming to said strut of said post, said skirt having a plurality of apertures through it through which selected ones of said conductive pins extend, and said neck extending upwardly along said strut and having an upper annular end located at said lower step of said strut;
   g) a second plurality of conductive paths on said upper surface of said sleeve, said paths extending radially inward across said skirt of said sleeve from selected ones of said plurality of conductive pins, upwardly along said neck of said sleeve, and terminating in a plurality of connection pads disposed on said upper end of said neck;
   h) upper and lower flexible wiring boards, each mounted to said upper surface of an associated one of said upper and lower rotors, each said wiring board comprising a thin sheet of flexible material having a central aperture centered on and corresponding to said bore of said hub of said associated rotor, and at least one arm extending radially outward from said aperture and along said at least one arm of said associated rotor and terminating at said distal end of said arm adjacent to said accelerometer thereon, said sheet containing a plurality of conductive paths, each said path originating in a connection pad adjacent to said central aperture and terminating in a connection pad adjacent to said accelerometer; and
   i) a plurality of conductive service loops connecting selected ones of said connection pads on said sleeve and said strut to adjacent ones of said connection pads on said upper and lower flexible conductor means, and connecting selected ones of said connection pads on said upper and lower flexible conductor means to adjacent, corresponding ones of said accelerometers.

15. Apparatus for coupling a pair of rotors, each having a hub with a bore therethrough on a common central axis, to one another for relative counter-oscillation about said axis comprising, in combination:
   a) a radially-extended rotor driver attached to said hub of each said rotor, each said driver having a spring part and a driver part;
   b) said spring part of each said driver comprising a radially-directed planar spring attached to said hub of said rotor, said spring having a distal end;
   c) said driver part of each said driver comprising a radially-directed planar vane attached to said hub of said rotor, said vane have a distal end;
   d) said distal ends of said vane and said spring being uncoupled to one another;
   e) means associated with each driver for causing said hub of said associated rotor to oscillate rotationally about said common central axis 180° out-of-phase with said hub of said other rotor in response to an applied electrical signal;
   f) said means for causing oscillation of said associated hub comprising a piezoelectric bimorph attached to each side of said vane;
   g) means, located in an equatorial plane between said rotors, for coupling said drivers to each other across said plane in pairs, and for mounting said coupled pairs of said drivers to a base; and
   h) means for electrically coupling said rotors to elements external to said apparatus through said hubs of said rotors and said base.

16. Apparatus as defined in claim 15, wherein said means for coupling and mounting said drivers comprises a coupling ring disposed in said equatorial plane and centered on said central axis and connecting said distal ends of said springs to one another across said plane.

17. Apparatus as defined in claim 16, wherein:
   a) said means for coupling and mounting said drivers further comprises a segment of an outer ring disposed in said equatorial plane and centered on said central axis;
   b) said segment couples said distal ends of said vanes to one another across said plane; and
   c) said segment has a portion that extends radially beyond said rotors.

18. Apparatus as defined in claim 17, wherein:
   a) said spring part of each said driver further comprises a pair of said springs;
   b) a connector piece connects said distal ends of said springs to each other; and
   c) said coupling ring couples said spring-connector pieces to each other across said plane.

19. Apparatus as defined in claim 18, wherein:
   a) said driver part of each said driver further comprises a pair of said vanes;
   b) a connector piece connects said distal ends of said vanes to each other; and
   c) said outer ring segment connects said vane-connector pieces to each other across said plane.

20. Apparatus as defined in claim 19, wherein said means for coupling and mounting said drivers further comprises means associated with said base and said outside portion of said outer ring segment for mounting said rotors to said base.

21. Apparatus as defined in claim 20, wherein:
a) each said rotor further comprises three rotor arms and three of said drivers; and
b) said rotor arms and said drivers are interposed with each other and symmetrically positioned about said hub of said rotor.

22. Apparatus as defined in claim 21, wherein said means for electrically connecting said rotors through said hubs and said base further comprise:
a) first means for introducing at least two isolated, conductive paths through said base, and for conveying a first one of said paths parallel to said central axis and through said central bore of said hub of a first one of said rotors to an upper surface of said first rotor, and for conveying a second one of said paths parallel to said central axis through said central bore of said hub of a second one of said rotors to an upper surface of said second rotor, said means for introducing and conveying said conductive paths including means for electrically isolating said first and second conductive paths from each other and from said base;
b) second and third means disposed on respective ones of said upper surfaces of said first and second rotors for conveying at least one isolated conductive path from a region adjacent to an associated one of said bores, radially outward along an associated one of said rotor arms, and to a region adjacent a distal end of said associated rotor arm; and
c) fourth means for electrically connecting an element located on a respective one of said distal arms of said rotors to an adjacent one of said conductive paths of an associated one of said second and third means for conveying, and for electrically connecting said conductive paths to an adjacent one of said first and second conductive paths of said first means for conveying, said fourth means for connecting including means for accommodating relative movement between said rotors and said first conveying means.

* * * * *